United States Patent Office 2,828,236
Patented Mar. 25, 1958

2,828,236

APPLICATION OF PERFLUOROCHLOROOLEFIN POLYMER COATINGS TO BASE MATERIALS

Fred W. West, Paterson, N. J., assignor, by mesne assignments, to Minnesota Mining and Manufacturing Company, St. Paul, Minn., a corporation of Delaware No Drawing. Application December 30, 1954
Serial No. 478,931

15 Claims. (Cl. 154—129)

This invention relates to a method for applying perfluorochloroolefin polymer coatings. This invention, additionally, relates to an adhesive for bonding perfluorochloroolefin polymer coatings to other objects.

The high degree of chemical stability and the unusual physical characteristics of the perfluorochloroolefins has led to their wide use in a variety of applications. However, the unusual properties of these materials has also made processing extremely difficult. Thus, while attempts have been made to use the perfluorochloroolefin polymers as coatings, their use in this respect has been seriously limited by their non-adhesive properties.

It is an object of this invention to provide a process for applying perfluorochloroolefin polymer coatings to base materials.

It is another object of this invention to provide an adhesive for use in preparing perfluorochloroolefin polymer laminates.

It is one of the particular objects of this invention to provide a process for applying perfluorochloroolefin polymer coatings to metal base materials, such as copper, iron, steel, aluminum and brass and to other solid base materials, such as glass and porcelain.

It is another of the particular objects of this invention to provide a process for applying perfluorochloroolefin polymer coatings to natural textile base materials, such as cotton, canvas and wool and to synthetic organic textile base materials, such as nylon, heat-resistant Orlon (polyacrylonitrile) and Saran (a vinylidene chloride-vinyl chloride copolymer) and to synthetic inorganic textile base materials, such as fiberglass, asbestos, etc.

Various other objects and advantages will become apparent to those skilled in the art on reading the accompanying description and disclosure.

Generally, the above objects are accomplished by interposing an epoxide resin between the coating and the base material and curing the epoxide resin while the coating and the base material are maintained closely adjacent. The interposed epoxide resin is usually applied as a layer on the base material although it can also be applied to the coating. After the epoxide resin is applied to one of the components, i. e., the coating or the base material, the second component is placed in contact with the epoxide layer and is maintained under slight pressure and, in some instances, at an elevated temperature to produce a structure in which individual components are strongly bonded together. The epoxide layer can be applied to both the coating and the base material although no particular advantage results from the use of such techniques.

As was indicated above, a perfluorochloroolefin polymer coating can be bonded to a base material by the process of this invention. The perfluorochloroolefin polymers to which this invention is applicable are prepared by polymerizing monomers, such as trifluorochloroethylene, dichlorodifluoroethylene (symmetrical and unsymmetrical), trichlorofluoroethylene, and copolymers of the above perfluorochloroolefins copolymerized with other halogenated olefins, such as vinyl chloride, vinylidene chloride, vinyl fluoride, vinylidene fluoride and tetrafluoroethylene. The invention is particularly applicable to the coating of base materials with homopolymers of trifluorochloroethylene having an N. S. T. (no strength temperature) of at least 220° C., preferably at least 240° C. The term polymer as used herein includes both homopolymers and copolymers.

Since the perfluorochloroolefin polymers are generally used where conditions are adverse, it will frequently be desirable to incorporate stabilizing agents in the polymer coating. Representative of such stabilizers, are cadmium oxide and sulfide, zinc oxide, chromium oxide and sulfide, aluminum oxide, etc. Additionally, materials imparting a lubricating surface to the coating can be incorporated such as graphite and molybdenum sulfide. For decorative purposes, and to conceal the base material, colored inorganic and organic pigments can be incorporated in the polymer coating.

The base materials to which the above described polymer coatings can be joined or bonded includes the above described polymers themselves and other polymeric and non-polymeric materials. Thus, the base materials to which polymer coatings can be bonded by the process of this invention comprise metals, such as iron, steel, aluminum and brass and other solid non-metallic materials, such as glass and porcelain. In addition, the base material can be a natural fiber textile, such as cotton, canvas, and wool, a synthetic organic textile, such as nylon, heat-resistant Orlon, etc. and inorganic textiles, such as fiberglass, asbestos, etc.

As was indicated above, the adhesive or bonding agent of this invention is an epoxide resin. The epoxide resins are prepared by reacting epichlorohydrin and epichlorohydrin substituted compounds with polyhydric compounds. Among the polyhydric compounds which may be employed, are alcohols, such as mannitol, sorbitol, erythritol, pentaerythritol and polyallyl alcohol; trihydric alcohols, such as glycerol and trimethylol propane; dihydric phenols, such as bisphenol (p,p' dihydroxydiphenyldimethyl methane) and trihydric phenols. Because of their greater bond strength, higher chemical resistance and availability, epoxide resins prepared by the condensation of bisphenol and epichlorohydrin are preferred. The degree of polymerization can be expressed by reference to the "epoxy value" which is defined as the equivalent of epoxy groups per 100 gms. of resin. The adhesives of this invention should have an epoxy value between about 0.03 and about 0.63. Another and more frequently used expression for indicating the degree of polymerization is the "epoxy equivalent" which is defined as the weight of resin in grams containing one gram equivalent of epoxy groups. Here, the higher the equivalent the higher the degree of polymerization. Under this definition, the adhesives of this invention should have an epoxy equivalent of at least 150. The epoxy equivalent of the adhesives of this invention should preferably not exceed about 3400. These epoxide resins are commercially available as "Epon," "Araldite" and "Exon." The condensation of bisphenol and epichlorohydrin is effected in the presence of NaOH. During the condensation, NaCl or HCl is split off to form a complex condensation product. These condensation products can be prepared in liquid and in solid form and have a melting point ranging from at least 0° C. to about 170° C.

In employing the adhesives of this invention, the perfluorochloroolefin polymer coating or the base material is coated with the epoxide resin. When liquid epoxide resins are employed, the liquid can be applied directly by brush or spray technique or may be dissolved in a suitable solvent, such as acetone, methyl ethyl ketone, cyclohexanone, etc. The solid epoxide resins can either be applied in the form of a powder which is melted before or after application or can be dissolved in one or more of the above listed solvents and applied by brush or spray technique. If a solution is used the solvent is preferably allowed to evaporate either by air-drying or by heating at temperatures up to about 100° C. After the surface of at least one of the components has been coated with the epoxide resin, the surface of the second component is brought into contact with the coated portion of the first surface. The resulting assembly is then maintained under slight pressure and preferably at an elevated temperature in order to cure the epoxy resin. The epoxide resins can be cured without a curing agent by heating at elevated temperatures for prolonged periods of time, e. g., 160° C. for about 12 hours. However, the use of curing agents is preferred. Among the curing agents which can be employed, are the di-isocyanates, e. g., methylene bis-(4-phenyl) isocyanate, dialdehydes, e. g., glyoxal, dimercaptans and amines. Amine curing agents are preferred. Representative of the amine curing agents, are diethylene triamine, dimethylamino propylamine, diethylamino propylamine, benzyl dimethylamine, piperidine, diethylamine, pyridine, and dicyandiamide. The curing agent is added to the epoxide in an amount between about 5 and about 15 weight percent. The epoxy resins will cure at room temperature when a curing agent is present, but the time required may, in some instances, be excessive. A temperature of at least 50° C. is required, while a temperature between about 100° C. and 300° C. is preferred. Temperatures should not exceed the decomposition temperature of the materials. Time necessary to effect the bonding operation, which depends on curing temperature, is between about 5 minutes and about 3 hours, preferably between 10 minutes and about 1 hour.

In order to illustrate the process of this invention the following examples, which are offered for purposes of illustration and which are not to be construed as unnecessarily limiting, are given.

*Example I*

This example illustrates the bonding or laminating of a coating of a homopolymer of trifluorochloroethylene (N.S.T. about 300) to an iron plate. An iron plate was grit-blasted and one portion was coated with an Epon VIII which is a liquid epoxide resin prepared by condensation of bisphenol with epichlorhydrin having a melting point of about 9° C. and an epoxy value of 0.5. To the epoxide resin was added 6 percent of 3-diethylamino propylamine as a curing agent. A 100 mil thickness of polytrifluorochloroethylene powder was spread over the iron plate so as to cover the portion which was covered with the epoxide resin and also to cover a portion of the uncoated iron plate. The plate and polytrifluorochloroethylene powder were pressed at 600 p. s. i. and at a temperature of 475° F. for 5 minutes. After pressing, the laminated structure was allowed to cool, after which it was attempted to peel off the polytrifluorochloroethylene coating. The coating in contact with the bare metal, peeled off readily, whereas the film which was in contact with the epoxy resin was firmly bonded.

By employing the procedure of Example I, homopolymers of trifluorochloroethylene (and other perfluorochloroolefin polymers) are bonded to other surfaces, such as copper, aluminum, brass, porcelain, and glass. It should be noted with respect to copper that by employing the technique of this invention a laminate of copper and polytrifluorochloroethylene is prepared without degradation of the polymer. Under ordinary circumstances copper promotes the degradation of polytrifluorochloroethylene. It should further be noted that while the process of Example I is effected by use of a powdered polymer, that films of the perfluorochloroolefins can also be used. Where powder is used, temperatures and pressures suitable for molding are required that is a temperature between about 230° C. and about 300° C. and a pressure between about 400 p. s. i. and 1000 p. s. i.

Where a film is used, high pressures are not required, a minimum pressure of about 16 p. s. i. being sufficient. High temperatures are also not required although they may be employed to shorten the time cycle.

While coatings of perfluorochloroolefin polymers on metal, prepared as described in Example I, are suitable in most applications, their use in those applications where excessive fluctuations in temperature can be expected is somewhat limited. This is due to the difference in thermal expansion between the metal and the perfluorochloroolefin polymer. Thus, where temperature cycles are extreme, the perfluorochloroolefin polymer will tend to separate from the metal surface. To offset this, a layer of woven fabric is positioned between the perfluorochloroolefin polymer and the metal surface. A variety of fabrics can be employed depending upon the environment in which the laminate is to be exposed. However, fiberglass because of its universal applicability is preferred. In preparing the perfluorochloroolefin polymer-textile laminates, the perfluorochloroolefin polymer is preferably bonded by heat and pressure to one side of the textile in such a way that the perfluorochloroolefin polymer softens and penetrates the interstices of the fabric. The polymer can also be bonded to the textile by using the epoxide resin adhesive. However, the mechanical technique is preferred since it insures greater thermal stability.

The following examples are presented to illustrate the preparation of laminates where a textile is interposed between the perfluorochloroolefin surface and the other solid surface.

*Example II*

Fiberglass fabric (22 mils) was preheated in an oven for 15 minutes at 250° C. The fiberglass was then placed in contact with a 5 mil film of a homopolymer of trifluorochloroethylene. The polymer and the fiberglass were placed in a press at 470° F. for about 5 minutes. The glass surface of the resulting laminate was then roughened with a spatula and Araldite 101 which is a liquid epoxide resin prepared by condensing bisphenol and epichlorhydrin and having a melting point of about 10° C., and an epoxy value of about 0.5 was applied to the fiberglass surface. To the epoxy resin was added approximately 6 percent of Araldite Hardener 951 which is 3-diethylamino propylamine as a catalyst. The epoxide resin surface of the resulting laminate was then pressed against an anodized aluminum panel and rolled with a small cylinder. This assembly was then heated for 6 hours at 50° C. A firmly bonded structure was produced.

*Example III*

An anodized aluminum panel was heated to 140° C. Araldite Type 1, which is a solid epoxide resin, prepared by condensing bisphenol and epichlorhydrin having a melting point of about 40° C. and an epoxy value of about 0.3 was sprinkled on the aluminum panel. This epoxide resin, additionally, contains about 5 percent by weight of aluminum powder. No catalyst was used. A laminate of glass cloth and polytrifluorochloroethylene prepared as described in Example I, was placed in contact with the epoxide resin surface of the aluminum panel. The resulting assembly was cured one hour at 190° C. A firmly bonded structure was obtained.

*Example IV*

Using the process as described in Example I, polytrifluorochloroethylene-glass laminates were bonded to each of the opposing flat surfaces of a 4" x 4" aluminum honeycomb. The cell size of the honeycomb was ⅛" and the thickness 1". A firmly bonded structure was obtained. This material is useful in the construction of tank walls for containing corrosive chemicals.

Various modifications and alterations of the process of this invention will be apparent to those skilled in the art and may be used without departing from the scope of this invention.

Having thus described my invention, I claim:

1. A method for applying a coating comprising a perfluorochloroolefin polymer to a base material which comprises interposing between said coating and said base material a fluid layer which comprises the condensation product of epichlorohydrin and a compound selected from the group consisting of polyhydric alcohols and polyhydric phenols, said condensation product having a melting point of at least 0° C. and an epoxy equivalent of at least 150.

2. A method for applying a coating comprising a perfluorochloroolefin polymer to a base material which comprises interposing between said coating and said base material a fluid layer which comprises a condensation product of epichlorohydrin and bisphenol, said condensation product having a melting point of at least 0° C. and an epoxy equivalent of at least 150 and maintaining said coating and said base material closely adjacent.

3. The method of claim 2 in which the condensation product of epichlorohydrin and bisphenol is applied as a powder and subsequently heated to render it fluid.

4. The method of claim 2 in which the perfluorochloroolefin polymer is a polymer of trifluorochloroethylene.

5. The method of claim 2 in which the base material is metal.

6. The method of claim 5 in which the metal is iron.

7. The method of claim 5 in which the metal is aluminum.

8. A method for bonding a coating comprising a trifluorochloroethylene polymer to a base material which comprises interposing between said coating and said base material a fluid layer which comprises the condensation product of epichlorohydrin and bisphenol, said condensation product having a melting point of at least 0° C. and an epoxy equivalent of at least 150 said condensation product containing between about 2 and about 8 percent by weight of an amine curing agent, maintaining said coating and said base material closely adjacent at a temperature of at least 50° C.

9. An article of manufacture which comprises a coating comprising a perfluorochloroolefin polymer, a metal base material and interposed therebetween a layer of the condensation product of epichlorohydrin and bisphenol.

10. An article of manufacture which comprises a coating comprising a trifluorochloroethylene polymer, an iron base material and interposed therebetween a layer of the condensation product of epichlorohydrin and bisphenol.

11. An article of manufacture which comprises a coating comprising a trifluorochloroethylene ploymer, an aluminum base material and interposed therebetween a layer of the condensation product of epichlorohydrin and bisphenol.

12. The article of manufacture of claim 11 in which the aluminum base material comprises the surface of a honeycomb structure.

13. A process for applying a perfluorochloroolefin polymer surface to another surface which comprises applying to a surface a coating comprising the condensation product of epichlorohydrin and a compound selected from the group consisting of polyhydric alcohols and polyhydric phenols, said condensation product having a melting point of at least 0° C. and an epoxy equivalent of at least 150 and containing between about 2 and about 8 percent by weight of an amine curing agent, contacting the coated surface with a surface to which it is to be bonded and maintaining the surfaces in contact.

14. A process for applying a trifluorochloroethylene polymer surface to another surface which comprises applying to a surface a coating comprising the condensation product of epichlorohydrin and bisphenol, said condensation product having a melting point of at least 0° C. and an epoxy equivalent of at least 150 and containing between about 2 and about 8 percent by weight of an amine curing agent, contacting the coated surface with a surface to which it is to be bonded and maintaining the surfaces in contact at a temperature of at least 50° C.

15. A process for applying a trifluorochloroethylene polymer surface to another surface which comprises applying to a surface a coating comprising the condensation product of epichlorohydrin and bisphenol, said condensation product having a melting point of at least 0° C. and an epoxy equivalent of at least 150 and containing between about 2 and about 8 weight percent of diethylamino propylamine, contacting the coated surface with the surface to which it is to be bonded and maintaining the surfaces in contact at a temperature between about 100° C. and about 300° C.

References Cited in the file of this patent

UNITED STATES PATENTS

| | | | |
|---|---|---|---|
| 2,484,484 | Berry | Oct. 11, | 1949 |
| 2,589,245 | Greenlee | Mar. 18, | 1952 |
| 2,682,490 | Gams et al. | June 29, | 1954 |

FOREIGN PATENTS

| | | | |
|---|---|---|---|
| 660,398 | Great Britain | Nov. 7, | 1951 |